US006257170B1

(12) United States Patent
Gundersen

(10) Patent No.: US 6,257,170 B1
(45) Date of Patent: Jul. 10, 2001

(54) AQUATIC HOUSING SYSTEM

(75) Inventor: Kristen Alyssa Gundersen, Danbury, CT (US)

(73) Assignee: Pharmacal Research Laboratories, Inc., Naugatuck, CT (US)

( * ) Notice: Subject to any disclaimer, the term of this patent is extended or adjusted under 35 U.S.C. 154(b) by 0 days.

(21) Appl. No.: 09/435,041

(22) Filed: Nov. 8, 1999

(51) Int. Cl.[7] ................................................. A01K 63/00
(52) U.S. Cl. ........................ 119/228; 119/245; 119/456; 119/458; 119/264
(58) Field of Search ................................... 119/228, 245, 119/264, 248, 250, 251, 246, 452, 455, 456, 458, 673; 4/538, 650, 651, 680, 673, 674

(56) References Cited

U.S. PATENT DOCUMENTS

| | | |
|---|---|---|
| 895,867 * | 8/1908 | Kirk . |
| 937,079 * | 10/1909 | Longfellow . |
| 3,571,820 * | 3/1971 | Jacuzzi . |
| 3,757,739 * | 9/1973 | Whitener ............................. 119/261 |
| 3,766,888 * | 10/1973 | Wiegardt, Jr. ....................... 119/240 |
| 3,774,575 * | 11/1973 | Patterson ............................. 119/245 |
| 3,860,977 * | 1/1975 | Politz ..................................... 4/682 |
| 3,981,273 * | 9/1976 | Buss .................................... 119/225 |
| 4,106,133 * | 8/1978 | Roberts .................................. 4/621 |
| 4,141,318 * | 2/1979 | McVane et al. . |
| 4,201,153 * | 5/1980 | Nace .................................... 119/224 |
| 4,336,620 * | 6/1982 | Gresh ..................................... 4/639 |
| 4,364,132 * | 12/1982 | Robinson ............................... 4/546 |
| 4,403,355 * | 9/1983 | Petty ...................................... 4/679 |
| 5,197,409 * | 3/1993 | Hammond ........................... 119/253 |
| 5,469,810 * | 11/1995 | Chiang ................................ 119/248 |
| 5,662,069 * | 9/1997 | Smith .................................. 119/665 |
| 5,849,185 * | 12/1998 | Judy, Jr. .............................. 210/169 |
| 5,996,535 * | 12/1999 | Semenuk et al. ................... 119/456 |
| 6,125,791 * | 10/2000 | Gundersen et al. ................. 119/228 |

OTHER PUBLICATIONS

Product Brochure for Marine Biotech X–MOD for Frogs of Marine Biotech, Inc., Aug. 11, 1999, 2 pages.
Pharmacal Research Labs, Inc. Aquatic Housing Systems brochure, undated, 6 pages.
Pharmacal Research Labs, Inc. Aquatic Housing System flyer, undated, 1 page.

* cited by examiner

*Primary Examiner*—Charles T. Jordan
*Assistant Examiner*—Yvonne R. Abbott
(74) *Attorney, Agent, or Firm*—Ohlandt, Greeley, Ruggiero & Perle, LLP; George W. Raushfass, Jr.

(57) ABSTRACT

An aquatic housing system that has a frame that defines two or more housing levels. Each housing level has a plurality of tanks for housing aquatic animals. Each tank has a front mounted plumbing assembly that allows both water overflow and drainage to be conveyed away from the tank. A valve located in the drainage connection allows the tanks to be flushed or converted from a deep water animal to a shallow water animal without removing the tank from the frame.

19 Claims, 3 Drawing Sheets

AQUATIC HOUSING SYSTEM

BACKGROUND OF THE INVENTION

1. Field of the Invention

This invention relates to a system for housing animals and, in particular, to an aquatic housing system for aquatic animals, such as fish, frogs and the like.

2. Description of the Prior Art

Aquatic housing systems are useful for breeding, feeding and maintaining aquatic animals. Aquatic housing systems have found particular use in the fields of developmental biology, pharmacology and medical research.

Aquatic housing systems generally have a rack construction that allows for several rows or levels of individual housing tanks to be stacked vertically. A water supply provides water to the tanks and a drainage assembly captures overflow water that exits an aperture near the top of the tank. An example of a known aquatic housing system is shown in U.S. patent application, Ser. No. 09/204,040, filed on Dec. 1, 1998 for Aquatic Housing System and assigned to the Assignee of this application.

A system for housing fish is currently available from Marine Biotech, Inc. of Beverly, Mass. This system has a rack construction that allows for several levels or rows of fish tanks to be stacked vertically. Each level has a tank shelf that serves a twofold purpose. First, it serves as a shelf to hold a row of fish tanks. Second it serves as drainage for water that empties, spills, splashes or overflows from the tanks. The shelf slopes downward to the back of the rack where a vertical waste column is formed along the entire width of the rack. A water manifold provides water to the tanks.

A system for housing frogs is also available from Marine Biotech, Inc. of Beverly, Mass. This system provides for overflow drainage via overflow apertures near the tops of the tanks. Only one species of frogs can be housed in this system at one time.

The aforementioned aquatic systems provide for drainage of water that overflows the tank. The tank must be removed for rinsing or flushing.

When frogs inhabit aquatic tanks, unconsumed food and other waste accumulate rapidly. Thus, there is a need for frequent cleaning by rinsing or flushing of tanks inhabited by frogs. The aforementioned aquatic housing systems utilize a circulating water system whereby overflow water is filtered and reused. When there is a lot of waste, filters tend to clog and need frequent replacement. Delay in replacing filters can result in harmful disease organisms remaining in the tanks that seriously affect the health of aquatic animals, such as frogs.

SUMMARY OF THE INVENTION

An object of the present invention is to provide an aquatic housing system that allows in situ flushing of the tanks.

Another object of the present invention is to provide an aquatic housing system that provides for both overflow and drainage from an aquatic tank.

Still another object of the present invention is to provide an aquatic housing system with gravity assisted drainage and waste removal.

An aquatic housing system according to the present invention includes one or more aquatic tanks disposed on a tank frame. A water distributor provides continuous flow of water to the tanks. A drainage plumbing assembly is coupled with the tank and positioned to capture water overflow from the tank and is selectively operable to drain water from the tank.

The tank has an overflow orifice near its top and a drain orifice near its bottom that are coupled with the drainage plumbing assembly. The tank and/or frame are dimensioned so that the tank bottom slopes downwardly at a small angle to the horizontal to provide gravity assisted removal of waste from the tank via the drainage plumbing assembly.

The tanks are substantially opaque so that the vision of a frog housed within one of the tanks is limited to the tank.

In another embodiment of the invention, a drainage plumbing assembly is coupled with the tank and is selectively operable to drain water from the tank. The frame and/or tank is dimensioned so that the tank bottom slopes downwardly at a small angle to the horizontal to provide gravity assisted removal of waste from the tank via the drainage plumbing assembly.

In a further embodiment, an aquatic tank has a top, a bottom and at least one side wall. An overflow orifice located in the side wall near the top and a drainage orifice is located in the side wall near the bottom. A drainage plumbing assembly is connected to the overflow orifice and to the drainage orifice for receiving water overflow via the overflow orifice and drainage water via the drainage orifice.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

Figure 1:
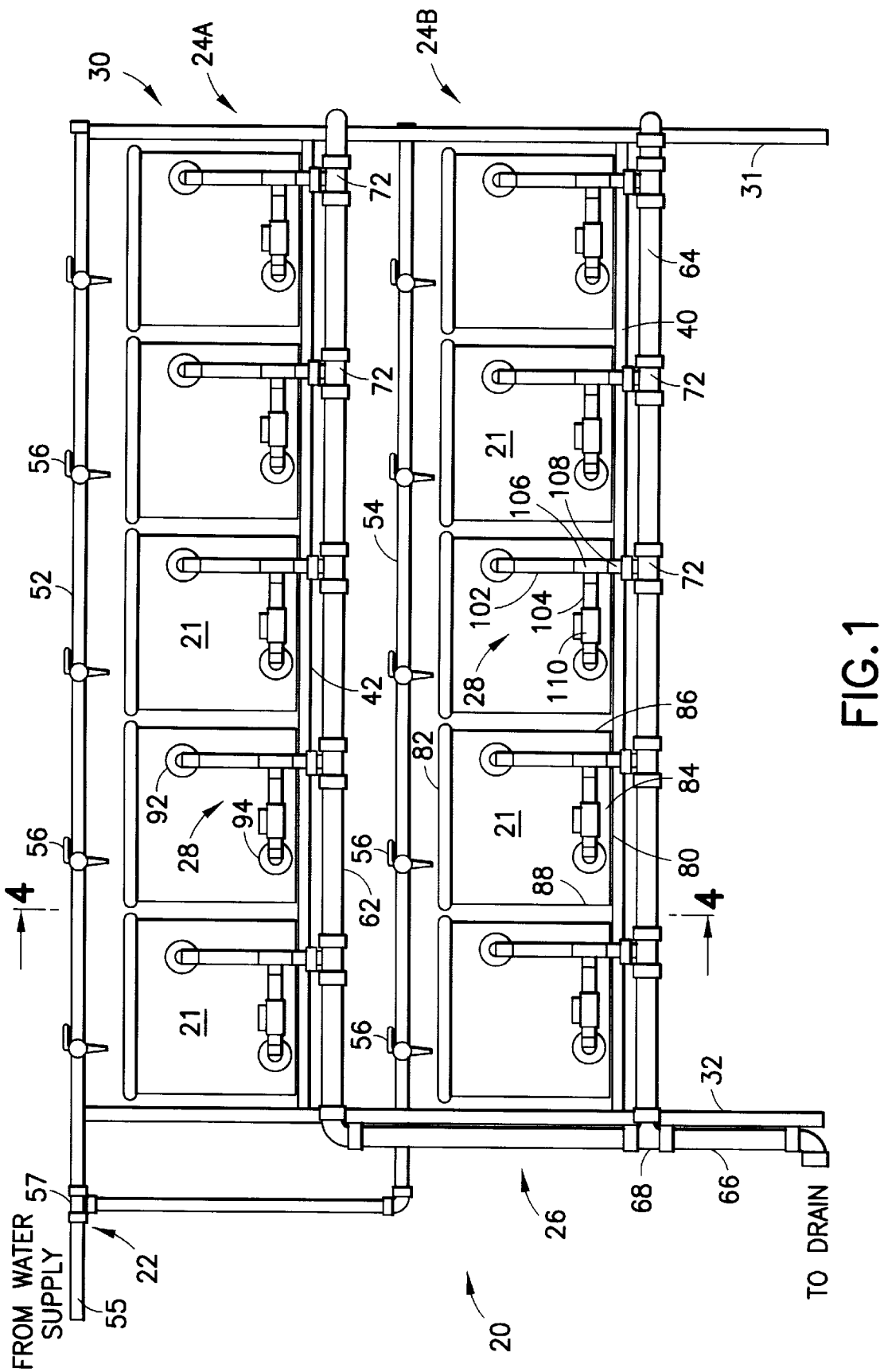
FIG. 1 is an elevational view of an aquatic housing system according to the present invention.

With reference to FIGS. 1 through 5, there is provided an aquatic housing system generally represented by numeral 20. Aquatic housing system 20 includes a frame or rack 30, a plurality of housing levels 24A and 24B, a plurality of aquatic animal tanks 21, a water distributor 22, a drain conveyor or pipe 26 and a plurality of drainage plumbing assemblies 28.

Figure 3:
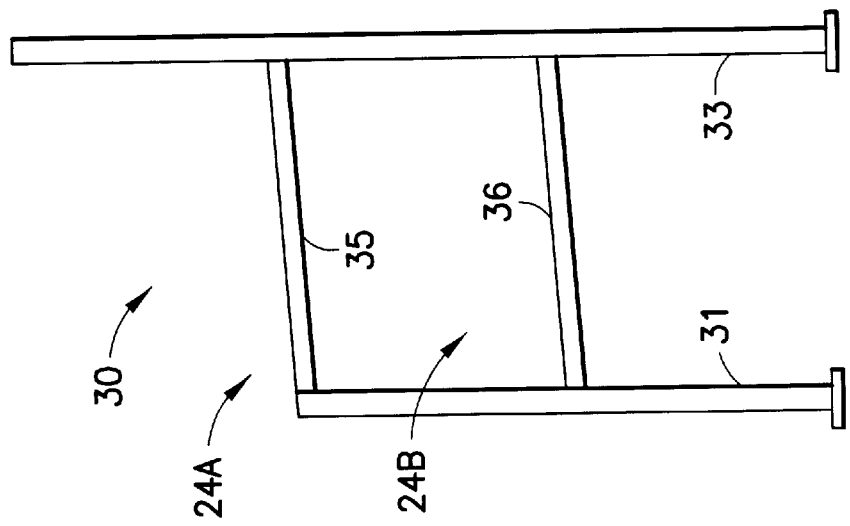
FIG. 3 is a side view of FIG. 2.
Figure 2:
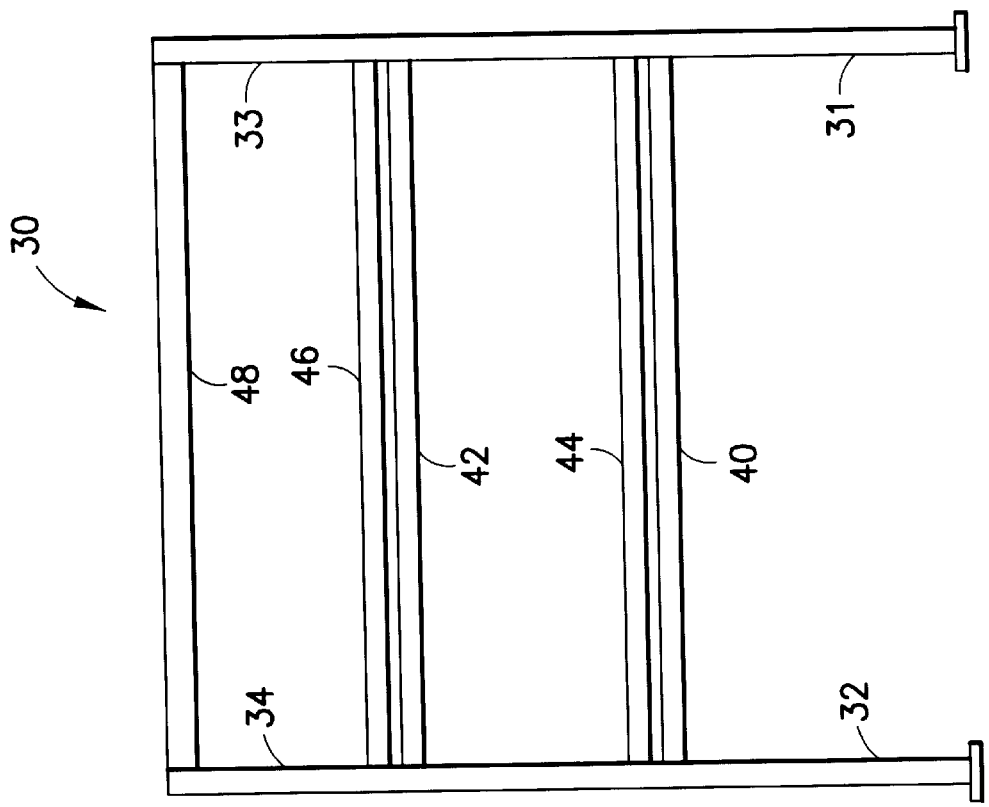
FIG. 2 is a front elevation view of the rack of the FIG. 1 aquatic housing system.
Figure 5:
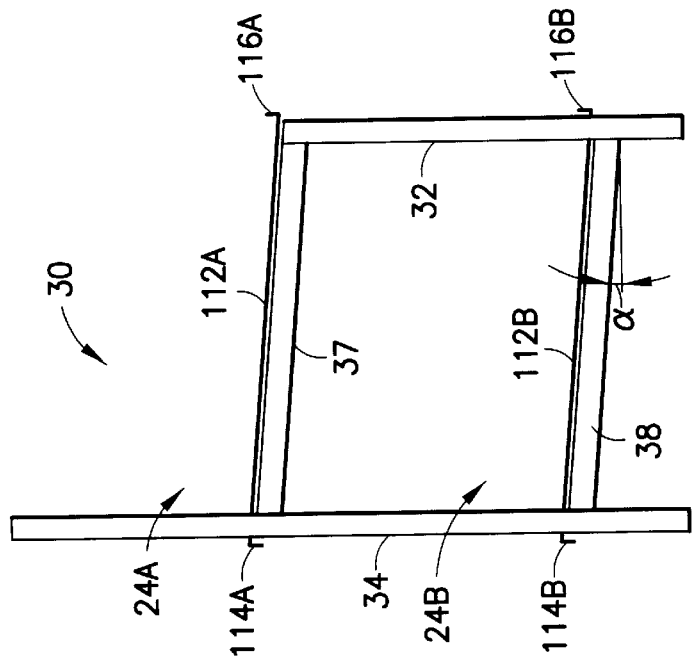
FIG. 5 is an end view of the rack.
Figure 4:
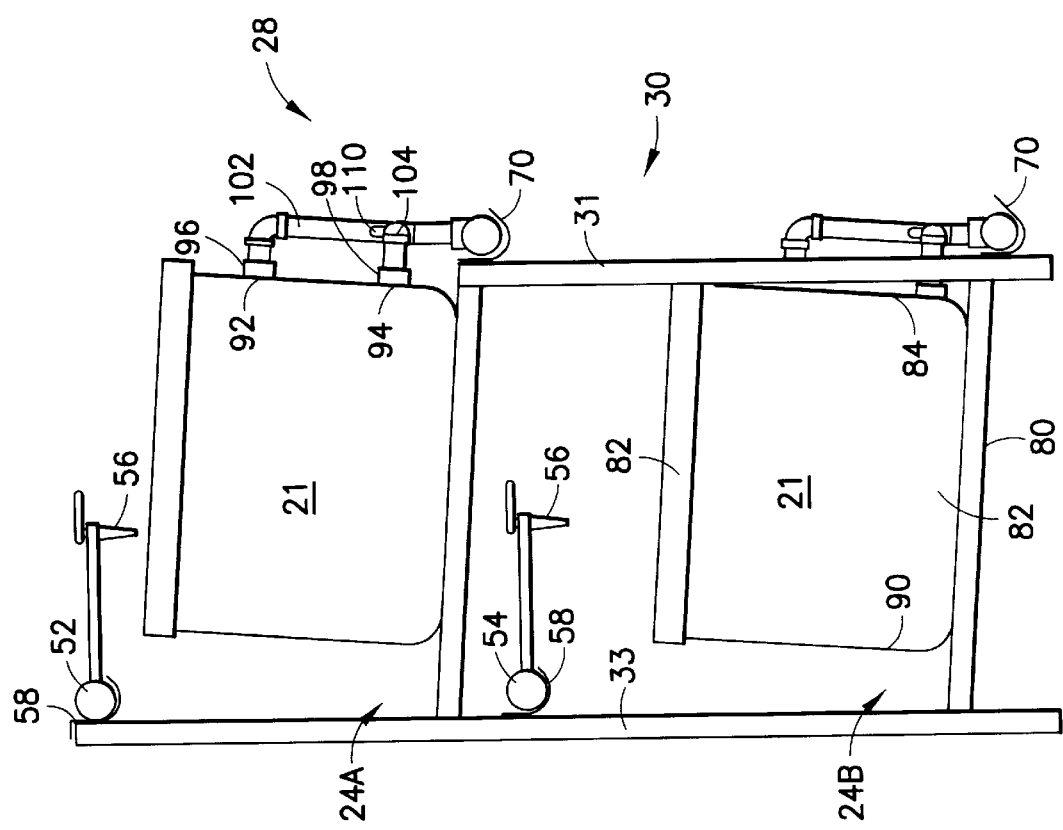
FIG. 4 is a cross-sectional view taken along line 4—4 of FIG. 1.

Rack 30 includes front corner posts 31 and 32 and back corner posts 33 and 34. As best seen in FIGS. 3 through 5, front corner posts 31 and 32 extend to the bottom of housing level 24A and back corner posts 33 and 34 extend above housing level 24A. Rack 30 also includes a plurality of side members that connect corner posts 31 and 33 at each housing level 24A and 24B. Thus, side members 35 and 36 (FIG. 3) connect front corner post 31 and back corner post 33 and side members 37 and 38 (FIG. 5) connect front corner post 32 and back corner post 34. Front corner posts 31 and 32 are interconnected by cross members 40 and 42. Back corner posts 33 and 34 are interconnected by cross members 44, 46 and 48. The connections of these members to the corner posts may be any suitable fasteners, such as bolts.

Corner posts 31 through 34, side members 35 through 38 and cross members 40, 42, 44, 46 and 48 are preferably stainless steel, but may be constructed with fiber glass material.

Water distributor 22 has a pipe 52 disposed above housing level 24A and a pipe 54 disposed above housing level 24B. Pipes 52 and 54 are joined with a water feed pipe 55 via a tee connector 57. Pipes 52 and 54 include a plurality of valves 56 located above tanks 21. Valves 56 are selectively operable to supply water to individual ones of tanks 21. Referring to FIG. 4, pipes 52 and 54 are supported by rack 30 by means of holders, such as J-bars 58 toward the back of rack of 30.

Drain pipe 26 has a pipe 62 disposed below housing level 24A and a pipe 64 disposed below housing level 24B. Pipes 62 and 64 are joined with a drain pipe 66 via a tee 68. Drain pipe 66 leads to a drain. Referring to FIG. 4, drain pipes 62 and 64 are supported by rack 30 with J-bars 70 at the front of rack 30. Drain pipes 62 and 64 include a plurality of tee connectors 72 located to the front and below each of tanks 21.

Aquatic animal tanks 21 have a bottom 80 and a top 82 that are joined by at least one side wall, as , for example for a cylindrical geometry. For a preferred embodiment, the tank geometry is box shaped with four sides 84, 86, 88 and 90. Top 82 may be completely open for aquatic animals that do not jump, for example, frogs of the Xenopus species such as Xenopus Laveis and Xenopus Tropicalis. Top 82 is partially open enough to admit water from valve 56 for aquatic animals that are capable of jumping, for example frogs of the Rana species, such as Rana Pipiens and Rana Catesbeiana.

Xenopus frogs tend to get nervous when humans are in the vicinity of aquatic housing system 20. Xenopus frogs react by repetitively bumping into the side walls, thereby incurring self-inflicted injury. For this reason, tanks 21 are preferably opaque, when used for Xenopus frogs, to limit the vision of the frogs to the tank. Tanks 21 are preferably constructed of molded polyethylene.

Referring to FIGS. 1 and 4, each tank 21 has an overflow orifice 92 located in side wall 84 near top 82 and a drainage orifice 94 located in side wall 84 near bottom 80.

Each drainage plumbing assembly 28 is connected to a different one of tanks 21 to capture water overflow as well as water drainage. Each drainage plumbing assembly 28 includes an overflow connector 102 and a drainage connector 104 that are joined by a tee 106 with a down connector 108. Overflow connector 102 is coupled to overflow orifice via an overflow fitting 96 and drainage connector 104 is coupled to drainage orifice via a drainage fitting 98. Down connector 108 is positioned in the upper extension of tee 72, whereby overflow and drainage water flow through connectors 102, 104, tee 106 and down connector 108 to pipe 62 or 64, tee 68 and pipe 66 to a drain. Connectors 102, 104, 106 and 108 may be any suitable plumbing conduit, rigid or flexible. Also, tee 106 can be omitted and connectors 102 and 104 shaped to direct overflow and drainage water directly to drain pipe 62 or 64.

Each drainage plumbing assembly 28 includes a selectively operable valve 110 that is manually operable from a closed position in which water is not drained from tank 21 and an open position in which water is drained from tank 21. Valves 110 allow tanks 21 to be drained, rinsed or flushed in situ without being removed from rack 30. Valves 110 may any suitable water valve, such as a single ball valve.

Down pipe 108 has a smaller diameter than that of tee 72 so that it merely slips in and out of tee when it is desired to remove a tank 21 from rack 30 for replacement, repair or washing.

Referring to FIG. 5, rack 30 and/or tanks 21 are dimensioned so that bottoms 80 of tanks 21 are at a slight angle α to the horizontal. By sloping bottoms 80, waste that settles on bottoms 80 tends to gravitate toward and localize near the front wall 84 of tank 21. This facilitates waste removal via drainage orifice 94 when valve 110 is open for a flushing operation. Angle α is preferably in the range of about 3° to 15°, more preferably in the range of about 3° to 10° and is most preferably 5°. As shown in FIGS. 2 through 5, rack 30 is designed so that back cross members 44 and 46 are higher than front cross members 40 and 42. Side members 35 through 37 slope downwardly by angle α from back corner posts 33 and 34 to front corner posts 31 and 32.

Referring to FIG. 5, a shelf 112A extending the width of rack 30 rests on back cross member 46 and front cross member 42. Shelf 112A has a downwardly extending back lip 114A that engages cross member 46 so as to prevent shelf 112A from sliding and maintain it in place. A shelf 112B extending the width of rack 30 rests on back cross member 44 and front cross member 40. Shelf 112B has a downwardly extending back lip 114B that engages cross member 46 so as to prevent shelf 112B from sliding and maintain it in place. Tanks 21 rest on shelves 112A and 112B. Shelves 112A and 112B have upwardly extending front lips 116A and 116B, respectively, to keep tanks 21 from sliding off rack 30.

For Xenopus frogs, drainage plumbing assembly 28 is operated with valve 110 closed. Tank 21 will fill to the level of overflow orifice 92. When this level has been achieved, continued water flow results in an overflow via orifice 92 and drainage plumbing assembly 26 to drain pipe 26. Such continued water flow allows water in tank 21 to be constantly flushed via overflow orifice 92.

For a flushing operation, valve 110 is opened. Water in tank 21 rapidly drains via drainage orifice 94 to the level of drainage orifice 94. Continued water flow acts to flush away waste and/or debris.

Rana frogs need a shallow water environment. To house Rana frogs, valve 110 is opened. If tank 21 is empty, water fills tank 21 to the level of drainage orifice 94. If tank 21 is full and valve 110 is opened, water drains via drainage orifice 94 to a level even with drainage orifice 94. Continued water flow results in water exiting via drainage orifice 94 and drainage plumbing assembly 28 to drain pipe 26.

The location of drainage plumbing assemblies 28 on front wall 84 of tanks 21 enables caretaker control of flushing and change over from housing Xenopus frogs to Rana frogs.

The aquatic housing system of the invention allows caretaker control of drainage and tank changeover from one type of aquatic animal to another. The opaque tanks shield caretakers and others from the vision of frogs. Aquatic housing system 20 can be concurrently used for multiple frog species.

It will be apparent to those skilled in the art that the size, shape and number of housing levels of rack 30 and the size, shape and number of tanks 21 depend on the needs and specification of the end user. The size of pipe for water distribution and drainage depends on water volume and water flow rate required by the end user.

The present invention having been thus described with particular reference to the preferred forms thereof, it will be obvious that various changes and modifications may be made therein without departing from the spirit and scope of the present invention as defined in the appended claims.

What is claimed is:

1. An aquatic housing system comprising:
a tank frame;
a tank disposed on said tank frame;

a water distributor supported by said frame for supplying a continuous flow of water to the tank;

a drainage plumbing assembly coupled with the tank and positioned to capture water overflow from the tank caused by said continuous water flow and being selectively operable to drain water from the tank, wherein the tank has an overflow orifice and a drain orifice coupled with the drainage plumbing assembly, wherein the tank has a top, a side wall and a bottom, and wherein the overflow orifice is located in the side wall near the top and the drain orifice is located in the side wall near the bottom, wherein the tank and/or frame are dimensioned so that the tank bottom slopes downwardly at a small angle to the horizontal to provide gravity assisted removal of waste from the tank via the drainage plumbing assembly.

2. The aquatic housing system of claim 1, wherein said angle is in a range of about 3° to 15°.

3. The aquatic housing system of claim 1, wherein said angle is in a range of about 3° to 10°.

4. The aquatic housing system of claim 1, wherein said angle is about 5°.

5. The aquatic housing system of claim 1, wherein the tank is one of a plurality of substantially identical tanks, wherein the water supply supplies a continuous flow to each of the tanks, and wherein the drainage plumbing assembly is one of a plurality of drainage plumbing assemblies each coupled with the overflow orifice and the drainage orifice of different ones of the tanks.

6. The aquatic housing system of claim 5, wherein the tanks are substantially opaque, whereby the vision of a frog housed within one of the tanks is limited to the tank.

7. The aquatic housing system of claim 6, wherein the frame is dimensioned to provide said angle.

8. The aquatic housing system of claim 7, wherein the frame includes one or more side members that. are disposed to the horizontal by said angle.

9. The aquatic housing system of claim 8, further comprising a shelf located on said side members, and wherein said tanks are disposed on said shelf in a sloping manner so that water drainage and waste removal are aided by gravity.

10. The aquatic housing system of claim 1, wherein the drainage plumbing assembly includes a valve that is selectively operable to drain water from the tank.

11. The aquatic housing system of claim 10, further comprising a drainage conveyor supported by the frame in a position to receive and convey water overflow and drainage away from the drainage plumbing assemblies.

12. The aquatic housing system of claim 11, wherein the drainage conveyor is a drain pipe with tee connectors to receive the water overflow and drainage from the drainage plumbing assemblies.

13. An aquatic housing system comprising:

a tank frame;

a tank disposed on said tank frame;

a water distributor supported by said frame for supplying water to the tank;

a drainage plumbing assembly coupled with the tank and being selectively operable to drain water from the tank; and wherein the tank has a side wall and a bottom, wherein a drainage orifice is located in the side wall near the bottom of the tank, wherein the drainage plumbing includes a drainage connector coupled with the drainage orifice, and wherein the tank and/or frame are dimensioned so that the tank bottom slopes downwardly at a small angle to the horizontal to provide gravity assisted removal of waste from the tank via the drainage plumbing assembly.

14. The aquatic housing system of claim 13, wherein said angle is in a range of about 3° to 15°.

15. The aquatic housing system of claim 13, wherein said angle is in a range of about 3° to 10°.

16. The aquatic housing system of claim 13, wherein said angle is about 5°.

17. The aquatic housing system of claim 13, wherein the drainage plumbing assembly includes a valve that is selectively operable to drain water from the tank.

18. The aquatic housing system of claim 17, further comprising a drainage conveyor supported by the frame in a position to receive and convey water overflow and drainage away from the drainage plumbing assemblies.

19. The aquatic housing system of claim 18, wherein the drainage conveyor is a drain pipe with tee connectors to receive the water overflow and drainage from the drainage plumbing assemblies.

* * * * *